(12) United States Patent
Frazier

(10) Patent No.: US 7,748,022 B1
(45) Date of Patent: Jun. 29, 2010

(54) REAL-TIME DATA CHARACTERIZATION WITH TOKEN GENERATION FOR FAST DATA RETRIEVAL

(75) Inventor: Brian Frazier, Santa Rosa, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 1165 days.

(21) Appl. No.: 11/359,747

(22) Filed: Feb. 21, 2006

(51) Int. Cl.
  *H04N 7/173* (2006.01)
  *H04N 5/225* (2006.01)
  *H04N 5/76* (2006.01)
  *G06F 7/00* (2006.01)
  *G06F 17/30* (2006.01)

(52) U.S. Cl. .............. 725/105; 348/207.1; 348/231.3; 707/6

(58) Field of Classification Search ........... 725/105, 725/115, 136, 137; 348/207.1, 231.2, 231.3, 348/231.9; 707/3, 6; 370/229, 230, 235
See application file for complete search history.

(56) References Cited

U.S. PATENT DOCUMENTS

| | | | | |
|---|---|---|---|---|
| 4,674,086 A | * | 6/1987 | Szczepanek et al. | 370/452 |
| 5,805,087 A | * | 9/1998 | Walker | 341/95 |
| 6,914,626 B2 | * | 7/2005 | Squibbs | 348/231.3 |
| 2002/0056043 A1 | * | 5/2002 | Glass | 713/179 |
| 2005/0041789 A1 | * | 2/2005 | Warren-Smith et al. | 379/93.24 |
| 2005/0108339 A1 | * | 5/2005 | Gleeson et al. | 709/206 |
| 2007/0113170 A1 | * | 5/2007 | Dignum et al. | 715/513 |
| 2007/0279494 A1 | * | 12/2007 | Aman et al. | 348/169 |

FOREIGN PATENT DOCUMENTS

WO   WO 2007000720 A1 *   1/2007

\* cited by examiner

*Primary Examiner*—Sinh Tran
*Assistant Examiner*—Daniel M Pasiewicz
(74) *Attorney, Agent, or Firm*—Mark J. Danielson; Pillsbury Winthrop Shaw Pittman LLP

(57) ABSTRACT

A method and apparatus provides for real-time video data characterization and fast image retrieval. According to one aspect, a token is generated based on blocks or portions of data in a data stream. A mathematical algorithm that operates in real-time during a capture process is used to generate the token. The generated tokens are stored together with the captured data. According to another aspect, a retrieval system compares a token value to obtain matching tokens within a given set of thresholds and corresponding data from the stored captured data.

33 Claims, 3 Drawing Sheets

REAL-TIME DATA CHARACTERIZATION WITH TOKEN GENERATION FOR FAST DATA RETRIEVAL

FIELD OF THE INVENTION

The present invention relates generally to processing of data steams, and more particularly to a real-time system and method for characterizing video and other data with tokens for subsequent fast image retrieval.

BACKGROUND OF THE INVENTION

Data capture systems can typically embed tags, headers and/or metadata along with the data to provide contextual information for the data. Such contextual information can include time stamps, frame identifiers and the like. However, such contextual information is only useful to distinguish one piece of data from another according to the information. For example, for a time stamp, this information only provides the ability to determine what piece of data was captured at what point in time.

Meanwhile, in a video data capture system for example, it is often desirable to rapidly identify images that are similar in appearance rather than those that just occur at a given time or at a certain number in a sequence. Often, when this is desired during post-capture analysis, complex image processing must be performed on all the data to search for and identify frames having the image of interest. This processing can take considerable amounts of time and require sophisticated image processing tools.

Accordingly, it would be desirable if there were a way to qualitatively characterize data during a capture process to facilitate subsequent retrieval during data analysis. It would be further desirable if this characterization process could be done without requiring complex processing power, and if it could be done in real-time while the data is being captured.

SUMMARY OF THE INVENTION

The present invention provides a method and apparatus for real-time video data characterization. According to one aspect, a token is generated based on blocks or portions of data in a data stream. A mathematical algorithm that operates in real-time during a capture process is used to generate the token. The generated tokens are stored together with the captured data. According to another aspect, a retrieval system compares a token value to obtain matching tokens within a given set of thresholds and corresponding data from the stored captured data.

In furtherance of these and other aspects, as broadly and fully described herein, an apparatus for characterizing data according to the invention comprises a math engine that receives a data stream and a control signal and calculates tokens based on the received data stream during respective intervals specified by the control signal. In some embodiments, the apparatus further comprises a control engine that receives a timing signal corresponding to the data stream and generates the control signal based thereon.

In additional furtherance of these and other aspects, as broadly and fully described herein, a method for characterizing data according to the invention comprises receiving a data stream and a control signal and calculating tokens based on the received data stream during respective intervals specified by the control signal. In some embodiments, the method further comprises a receiving a timing signal corresponding to the data stream and generating the control signal based thereon.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Generally, the present invention recognizes that captured data such as video data is typically in the form of a stream of serial data, and so various mathematical operations can be performed on the data in real time to uniquely characterize it. These mathematical operations can generate computed values, or "tokens," that are qualitatively unique to a specific frame of video or other subset of the data. In the case of video data, the tokens can be generated based on certain or all color components of the video, a specific small window within a full video frame, or many other possible characterizations.

Figures 1, 2:
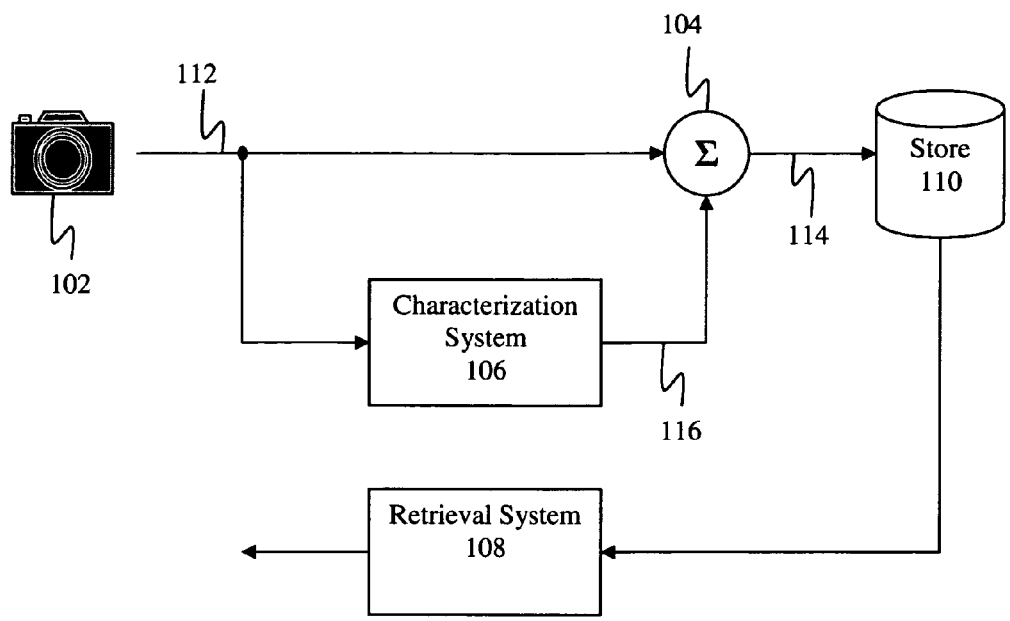
FIG. 1 is a block diagram illustrating the data characterization and retrieval principles of the invention.
FIG. 2 is a diagram illustrating an example output data stream according to the invention.

FIG. 1 is a block diagram illustrating the general principles of the invention. As shown in FIG. 1, a data source 102 produces image or other data 112. In a preferred application, data source 102 is a still or video camera, but the invention is not limited to this example, and can include other types of image sensors and other types of data sources and sensors such as electronic instruments, microphones, etc. Indeed, the invention can be applied to almost any type of stream of data that has some natural or defined subset or interval such as a frame. Moreover, although only one data source 102 is shown, there may be more than one data source for which data is processed by one or more characterization systems. The data may be produced by source 102 in accordance with timing or other synchronization sources (not shown), and other components may further receive such timing information. However, details of such timing techniques and/or sources are not necessary for an understanding of the present invention. In an example where source 102 is a video camera, data 112 can be a 221 Mbit/s stream of serial data comprising 30 frames of 640×480 24-bit pixel images per second. It should be noted that it is preferred that the data be in a raw format before characterization. However, the invention could be applied either in addition to, or in place of, compression or other processing such as formatting according to a JPEG/MPEG standard.

As further shown in FIG. 1, both combiner 104 and characterization system 106 receive data 112 from source 102. The characterization system 106 generates tokens 116 based on the data 112 which are further provided to combiner 104, which produces output stream 114.

Combiner 104 can be a simple multiplexer which merely combines data from source 102 and tokens from system 106 in accordance with a predetermined timing or data capture interval such as a frame. In other embodiments, combiner 104 can generate metadata or insert additional information associated with the data into the output stream 114. In one example, combiner 104 can include a metadata generator such as that described in co-pending application Ser. No. 11/342,245, commonly owned by the assignee of the present invention, the contents of which are incorporated herein by reference. Alternatively, combiner 104 can be omitted, and the tokens 116 can be provided separately from the data 112, either alone or in combination with other metadata related to the data 112.

The output stream 114 containing the data and the tokens is provided to a recording device or media 110 which is, for example, magnetic tape or any other analog or digital storage media. An example format of output stream 114 is shown in FIG. 2. In this example, the output stream 114 contains n frames of video data, with a frame ID and token associated with each frame. The token is generated by characterization system 106. The frame ID can be generated by the data source 102, or can be added by combiner 104 or other systems.

It should be noted that the order of data, tokens and identifiers can be interchangeable, and that the stream can include other data or metadata. Moreover, it is not necessary that a single token be generated for one frame. For example, there can be several tokens for one frame, one token for just a portion of a frame, or one token for multiple frames. However, an aspect of the invention is that a unique token be related to a defined "frame interval" or other periodically occurring subset of bits in a data stream, which is either native to the stream itself, or results from some type of fusion or reframing processing performed on the stream. Moreover, it is not necessary for tokens to be included with the data stream it characterizes, but the tokens and data can be maintained separately, as long as there is some common identifier that relates the two. And finally, the tokens can be included as part as existing header or other metadata in the stream, such as part of a TIFF header.

Retrieval system 108 is implemented by a computer such as a PC with software for reading data stored in 110 and for interacting with a user to view the data and obtain criteria for searching for desired data. It should be noted that system 108 can be located remotely from data source 102, characterization system 106 and/or storage 110, and can obtain data from storage 110 through a communication means such as a network.

System 108 can use the tokens to enable quick searching and retrieval of data stored in 110. For example, subsequent data retrieval can be based on matching, within limits, the token of a known video frame against all video frames archived and for which tokens were generated using the same algorithm or system. The stored data can also be indexed according to token values to further facilitate fast searching and retrieval, in which case storage system 110 and/or retrieval system 108 can include or be comprised of one or more databases or equivalent systems.

As should be apparent from the above, the invention thus provides the ability to rapidly characterize data during a data capture process which further allows for quick search and retrieval in post analysis.

Figure 3:
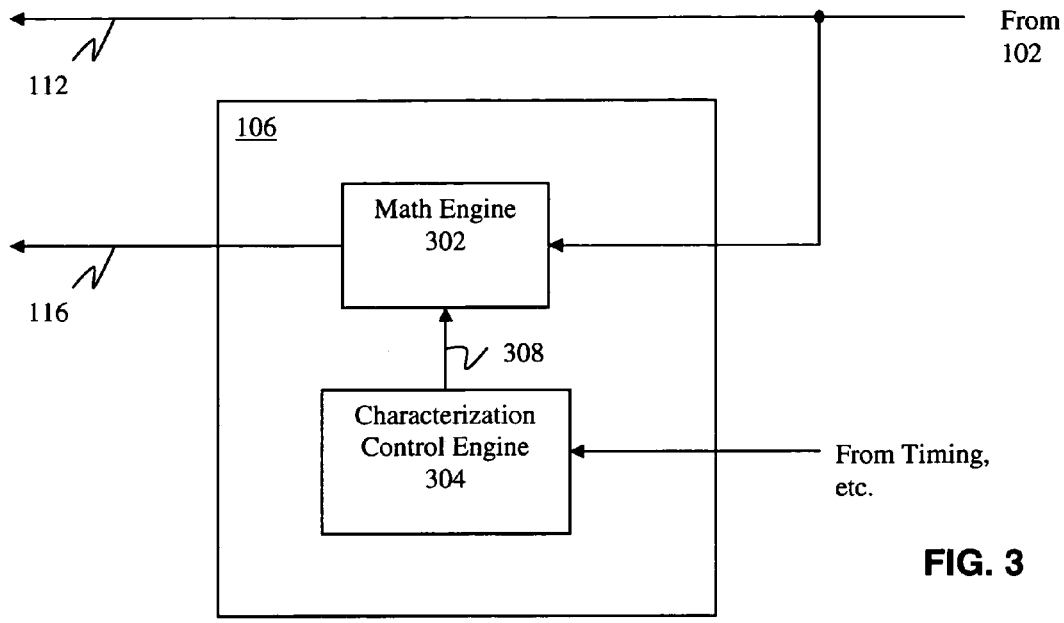
FIG. 3 is a block diagram further illustrating a data characterization system according to one embodiment of the invention.

FIG. 3 is a block diagram illustrating an example implementation of a data characterization system in accordance with the principles of the present invention. As shown in FIG. 3, characterization system 106 includes a math engine 302 and a characterization control engine 304. The math engine 302 and characterization control engine 304 are preferably implemented together in a single integrated circuit such as an FPGA, for example a Spartan 3 Series FPGA from Xilinx of San Jose, Calif.

In general, math engine 302 applies one of a variety of possible mathematical operations to the incoming data such as a video stream to produce tokens based on the data. Characterization control engine 304 controls the operation of math engine 302 via a signal 308, and allows for synchronization of operation in accordance with a predetermined time interval, such as a frame of video data. Alternatively or additionally, engine 304 can control engine 302 with signal 308 so that it only operates on a subset of the data 112, such as a specified window within a frame, as will become apparent from descriptions below.

Figure 4:
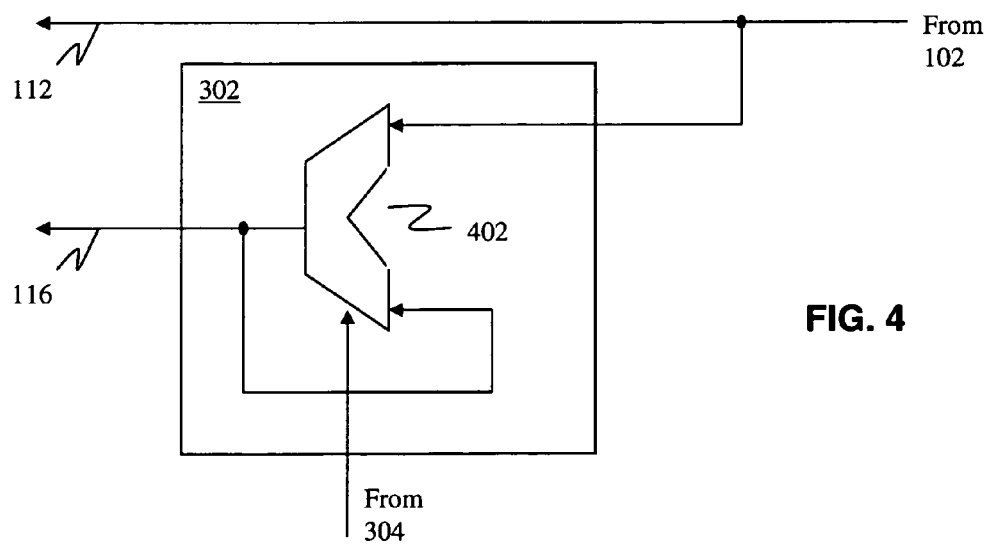
FIG. 4 is a block diagram further illustrating a math engine for a data characterization system according to one embodiment of the invention.

One example implementation of a math engine in accordance with the principles of the invention is shown in FIG. 4. As shown in this example, a running sum of the incoming data is computed by accumulator 402 and a token generated therefrom while enabled by a signal from control engine 304. The token generated by this implementation would thus be an arithmetic sum of all the pixel values in the video frame. However, many other mathematical functions could be implemented using this approach. In an example implementation where the incoming data is raw 24 bit/pixel serial video data having a 221 Mbit/sec bit rate and 30 Hz frame rate, accumulator 402 is implemented in an FPGA having an operating frequency of 50 MHz, and the generated token is a 64 bit value per frame. Those skilled in the art will understand that various alternatives are possible based on the format of the incoming data (e.g. parallel vs. serial), the device that implements the token generation, and the complexity of the mathematical function that is used.

As further shown in FIG. 4, the accumulator 402 receives a control signal to enable and/or disable accumulation of data. This would allow approaches like windowing specific portions of a video frame for mathematical encoding instead of a whole frame, as will be discussed in more detail below. Other control signals (either combined with the enable/disable signal or separately provided) could possibly include a clear function (i.e. resetting the token to zero or other known value), a value storage function (i.e. saving the current token value in, or retrieving a saved token from, a register or other storage location), or data inversion (i.e. XOR-ing). The enable/disable control signal is preferably generated by characterization control engine 304 as shown in FIG. 3 and described in more detail below.

Figure 5:
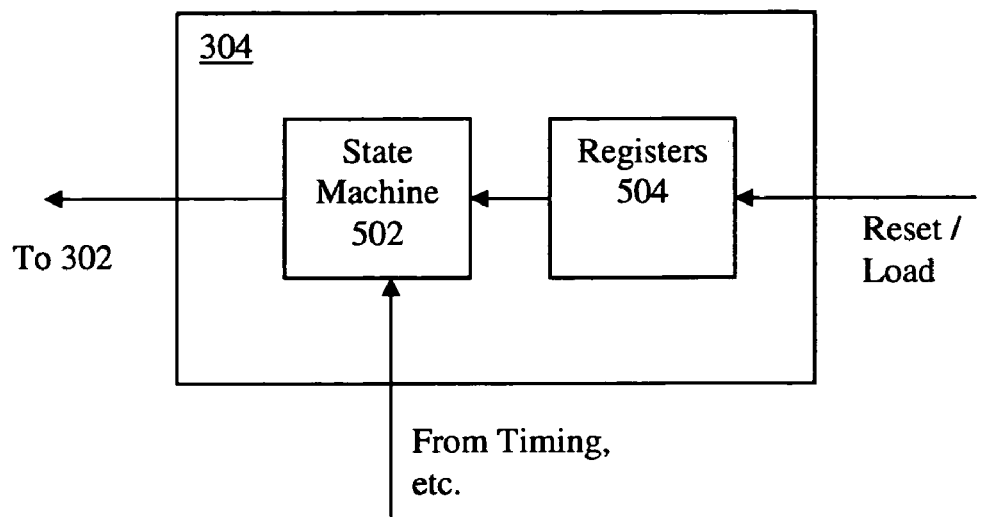
FIG. 5 is a block diagram further illustrating a characterization control engine for a data characterization system according to one embodiment of the invention.

FIG. 5 is a diagram illustrating an example implementation of a characterization control engine according to the principles of the invention. As shown in FIG. 5, engine 304 includes a state machine 502 for controlling the math engine. The characterization control engine further includes registers 504 to store control information for the system that it is implemented in as well as a control flow.

State machine 502 can generate the control signal based on information in registers 504, as well as information received over a communication link such as a system bus. This information can include timing or synchronization information, such as a clock synchronized to a clock of the data stream, or a system clock combined with a frame synchronization signal corresponding to a frame rate of the data stream. Information in registers 504 typically includes information regarding a subset of the data that is to be characterized, such as a window within a frame, a particular frame in a given number of sequential frames, etc. Registers 504 or other components in control engine 304 may also maintain information about the format and timing of the data stream, such as the overall size of each frame, the size and/or location of header or metadata to be excluded from processing, etc. The information in registers 504 can be reset or reloaded through an external signal.

Figure 6:
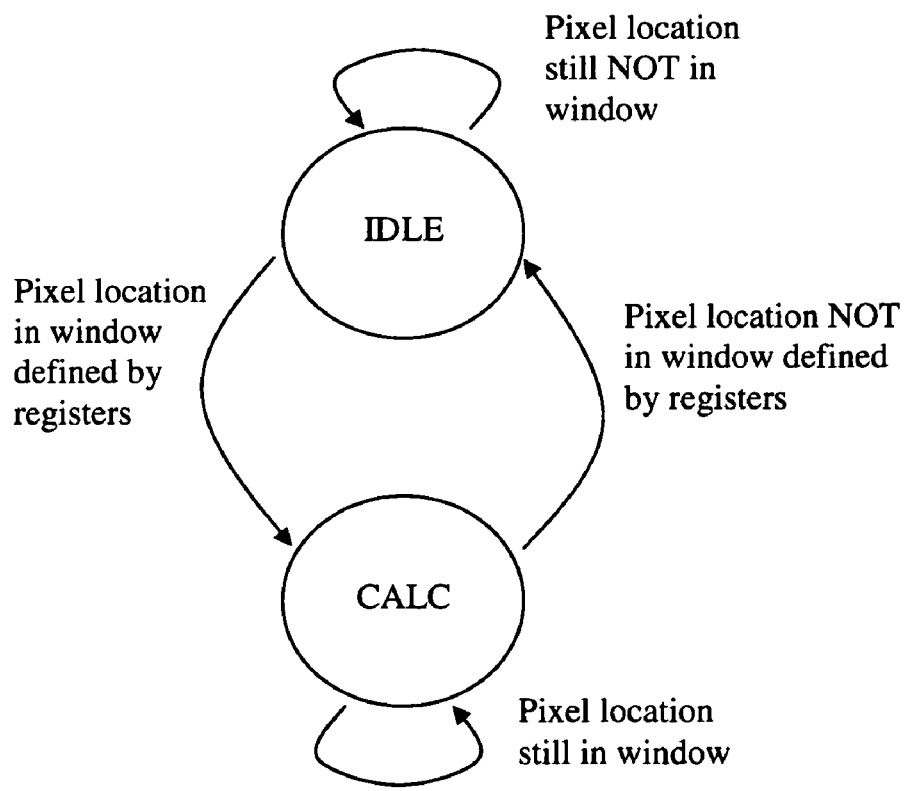
FIG. 6 is a state diagram illustrating an example implementation of a state machine for a data characterization system according to one embodiment of the invention.

FIG. 6 is a state transition diagram that illustrates an example implementation of characterization control engine 304. In this example, the characterization control engine 304 enables the math engine to generate tokens when a portion of the video stream representing data within a specified window of the current video frame flows through the math engine. The window is defined by data in registers 504, which data can include the offset (e.g. X and Y coordinates) of the window from an origin of the frame, as well as the dimensions of the window (e.g. rectangular width and height with respect to the offsets). When data from portions of the current video frame are not within the specified window, the control engine disables the math engine. It should be noted that control engine 304 can utilize the timing information and/or information in registers 504 to generate further or combined signals instructing the math engine to store the computed token and/or to reset the token value. Those skilled in the art will understand how such control signals can be generated based on the window offsets and dimensions, given the known dimensions of the entire frame and the timing, format and arrangement of data in the data stream.

As shown in FIG. 2, each token that is generated is preferably inserted in the stream with the video frame that it was generated from, and then stored along with the video data. It should be noted that, in embodiments where a uniform data sequence is desired, dummy tokens can be inserted when only a subset of the data is processed. As set forth above, moreover, in certain embodiments, the token can be used by a database to actively index the stored data in real-time for later searching.

One example retrieval method according to the invention could include matching a known image to those that were tokenized in storage. First a token for a known image is obtained. For example, the token can be generated from the image by using the same operation as that implemented in the math engine. As another example, the token can be obtained by reading the token associated with the image if the known image was obtained from storage. Next, that token would be taken (with limits applied for searching purposes) and used to search for matching tokens from the archived video frames. In an example where a database is used, an a query can be made to locate the matching tokens. Once matching tokens are identified, the associated video data can be quickly obtained. This method provides a quick approach to searching through video imagery which can be voluminous, and without sophisticated image processing techniques.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An apparatus for characterizing data comprising:
a math engine that receives a data stream and a control signal and calculates tokens based on the received data stream during respective intervals specified by the control signal,
wherein the data stream has a data rate, and wherein within each of the intervals the data stream comprises a plurality of data words defined by the data rate and a duration of the intervals, each of the data words having a numerical value defined by the data bits therein, and wherein each of the tokens comprise a single number that is a result of a common mathematical operation performed using the numerical values of the plurality of data words; and
a control engine that receives a timing signal corresponding to the data stream and generates the control signal based thereon, wherein the control engine includes:
a register that specifies a portion of the data stream for which tokens are desired; and
a state machine that receives the timing signal and uses contents of the register to determine whether the control signal should be generated.

2. An apparatus according to claim 1, wherein the data stream comprises video data and the intervals correspond to a video frame.

3. An apparatus according to claim 1, wherein the data stream comprises video data and the intervals correspond to a video frame, and wherein the control engine is operative to generate the control signal based on a video frame rate.

4. An apparatus according to claim 1, wherein the data stream comprises video data and the intervals correspond to a window within a video frame.

5. An apparatus according to claim 1, wherein the data stream comprises video data and the intervals correspond to a window within a video frame, and wherein the control engine is operative to generate the control signal based on a computed portion of the video frame rate corresponding to the window.

6. An apparatus according to 5, wherein the control engine includes a register for storing information regarding the window.

7. An apparatus according to claim 1, wherein the tokens comprise a running sum of the data stream during the respective interval.

8. An apparatus according to claim 2, wherein the tokens comprise a running sum of the data stream during the respective interval.

9. An apparatus according to claim 1, further comprising a combiner that produces an output stream comprising the calculated tokens and the data stream.

10. An apparatus according to claim 1, further comprising a database that stores and indexes the calculated tokens.

11. An apparatus according to claim 1, further comprising a retrieval system that is adapted to search stored data corresponding to the data stream using the calculated tokens.

12. A method for characterizing data comprising:
receiving a data stream and a control signal;
calculating tokens based on the received data stream during respective intervals specified by the control signal,
wherein the data stream has a data rate, and wherein within each of the intervals the data stream comprises a plurality of data words defined by the data rate and a duration of the intervals, each of the data words having a numerical value defined by the data bits therein, and wherein each of the tokens comprise a single number that is a result of a common mathematical operation performed using the numerical values of the plurality of data words;
receiving a timing signal corresponding to the data stream; and
generating the control signal based thereon, wherein the generating step includes:
storing a value that specifies a portion of the data stream for which tokens are desired in a register; and
using the stored value in the register to determine whether the control signal should be generated.

13. A method according to claim 12, wherein the data stream comprises video data and the intervals correspond to a video frame.

14. A method according to claim 12, wherein the data stream comprises video data and the intervals correspond to a video frame, and wherein the generating step includes generating the control signal based on a video frame rate.

15. A method according to claim 12, wherein the data stream comprises video data and the intervals correspond to a window within a video frame.

16. A method according to claim 12, wherein the data stream comprises video data and the intervals correspond to a window within a video frame, and wherein the generating step includes generating the control signal based on a computed portion of the video frame rate corresponding to the window.

17. A method according to 16, further comprising storing information regarding the window in a register.

18. A method according to claim 12, wherein the calculating step includes computing a running sum of the data stream during the respective interval.

19. A method according to claim 13, wherein the calculating step includes computing a running sum of the data stream during the respective interval.

20. A method according to claim 12, further comprising:
combining the calculated tokens and the data stream to produce an output stream.

21. A method according to claim 12, further comprising:
storing and indexing the calculated tokens.

22. A method according to claim 12, further comprising searching stored data corresponding to the data stream using the calculated tokens.

23. An apparatus for characterizing data comprising:
means for receiving a data stream and a control signal; and
means for calculating tokens based on the received data stream during respective intervals specified by the control signal,
wherein the data stream has a data rate, and wherein within each of the intervals the data stream comprises a plurality of data words defined by the data rate and a duration of the intervals, each of the data words having a numerical value defined by the data bits therein, and wherein each of the tokens comprise a single number that is a result of a common mathematical operation performed using the numerical values of the plurality of data words;
means for receiving a timing signal corresponding to the data stream; and
means for generating the control signal based thereon, wherein the generating means includes:
means for storing a value that specifies a portion of the data stream for which tokens are desired in a register; and
means for using the stored value in the register to determine whether the control signal should be generated.

24. An apparatus according to claim 23, wherein the data stream comprises video data and the intervals correspond to a video frame.

25. An apparatus according to claim 23, wherein the data stream comprises video data and the intervals correspond to a video frame, and wherein the generating means includes means for generating the control signal based on a video frame rate.

26. An apparatus according to claim 23, wherein the data stream comprises video data and the intervals correspond to a window within a video frame.

27. An apparatus according to claim 23, wherein the data stream comprises video data and the intervals correspond to a window within a video frame, and wherein the generating means includes means for generating the control signal based on a computed portion of the video frame rate corresponding to the window.

28. An apparatus according to 27, further comprising means for storing information regarding the window.

29. An apparatus according to claim 23, wherein the calculating means includes means for computing a running sum of the data stream during the respective interval.

30. An apparatus according to claim 24, wherein the calculating means includes means for computing a running sum of the data stream during the respective interval.

31. An apparatus according to claim 23, further comprising:
means for combining the calculated tokens and the data stream to produce an output stream.

32. An apparatus according to claim 23, further comprising:
means for storing and indexing the calculated tokens.

33. An apparatus according to claim 23, further comprising means for searching stored data corresponding to the data stream using the calculated tokens.

* * * * *